United States Patent [19]
Dyer et al.

[11] Patent Number: 5,599,383
[45] Date of Patent: Feb. 4, 1997

[54] TUBULAR SOLID-STATE MEMBRANE MODULE

[75] Inventors: Paul N. Dyer, Allentown, Pa.; Jeffrey D. Bright, Salt Lake City, Utah; Michael F. Carolan, Allentown, Pa.; Eric Minford, Laurys Station, Pa.; Robin E. Richards, Lansdale, Pa.; Steven L. Russek, Allentown, Pa.; Dale M. Taylor, Salt Lake City; Merrill A. Wilson, West Jordan, both of Utah

[73] Assignee: Air Products and Chemicals, Inc., Allentown, Pa.

[21] Appl. No.: 403,050

[22] Filed: Mar. 13, 1995

[51] Int. Cl.⁶ .................... B01D 53/22; B01D 63/06; B01D 71/02
[52] U.S. Cl. .................... 96/8; 96/10; 96/11
[58] Field of Search .................... 55/501, 523, 524; 95/54; 96/4, 8–11

[56] References Cited

U.S. PATENT DOCUMENTS

| | | | |
|---|---|---|---|
| 3,407,571 | 10/1968 | Sherwood | 96/10 |
| 4,490,445 | 12/1984 | Hsu | 429/32 |
| 4,514,302 | 4/1985 | van Zon et al. | 96/10 X |
| 4,791,079 | 12/1988 | Hazbun | 502/4 |
| 4,877,506 | 10/1989 | Fee et al. | 204/242 |
| 4,902,420 | 2/1990 | Pall et al. | 55/501 X |
| 4,986,837 | 1/1991 | Shibata | 96/8 X |
| 5,034,023 | 7/1991 | Thompson | 55/2 |
| 5,045,169 | 9/1991 | Feduska et al. | 204/258 |
| 5,108,465 | 4/1992 | Bauer et al. | 96/8 X |
| 5,160,618 | 11/1992 | Burggraaf et al. | 210/490 |
| 5,240,473 | 8/1993 | Carolan et al. | 96/4 X |
| 5,240,480 | 8/1993 | Thorogood et al. | 96/4 |
| 5,261,932 | 11/1993 | Carolan et al. | 96/4 X |
| 5,269,822 | 12/1993 | Carolan et al. | 96/4 X |
| 5,332,597 | 7/1994 | Carolan et al. | 427/243 |
| 5,342,431 | 8/1994 | Anderson et al. | 96/10 X |
| 5,356,728 | 10/1994 | Balachandran et al. | 429/8 |

FOREIGN PATENT DOCUMENTS

WO94/24065  10/1994  WIPO .

Primary Examiner—Robert H. Spitzer
Attorney, Agent, or Firm—Keith D. Gourley

[57] ABSTRACT

Tubular solid-state membrane modules for separating oxygen from an oxygen-containing gaseous mixture which provide improved pneumatic and structural integrity and ease of manifolding. The modules are formed from a plurality of tubular membrane units, each membrane unit which comprises a channel-free porous support having connected through porosity which is in contact with a contiguous dense mixed conducting oxide layer having no connected through porosity. The dense mixed conducting oxide layer is placed in flow communication with the oxygen-containing gaseous mixture to be separated and the channel-free porous support of each membrane unit is placed in flow communication with one or more manifolds or conduits for discharging oxygen which has been separated from the oxygen-containing gaseous mixture by permeation through the dense mixed conducting oxide layer of each membrane unit and passage into the manifolds or conduits via the channel-free porous support of each membrane unit.

14 Claims, 5 Drawing Sheets

TUBULAR SOLID-STATE MEMBRANE MODULE

FIELD OF THE INVENTION

This invention relates to tubular solid-state membrane modules formed from a plurality of tubular membrane units which are capable of separating oxygen from an oxygen-containing gaseous mixture. The modules which provide improved pneumatic integrity are fabricated from a plurality of tubular solid-state membrane units comprising mixed conducting metallic oxides which exhibit electron conductivity and oxygen ion conductivity at elevated temperatures.

BACKGROUND OF THE INVENTION

Solid state membranes formed from oxygen ion-conducting materials continue to show promise in a variety of commercial processes including the separating of oxygen from oxygen-containing gaseous mixtures. Representative solid-state membranes are those formed from multicomponent metallic oxides which are typically operated at high temperatures (e.g. 700° C. or more) wherein the solid-state membranes conduct both oxygen ions and electrons. When a difference in oxygen partial pressure exists on opposite sides of the mixed conducting metallic oxide membrane and operating conditions are properly controlled, oxygen is separated from the oxygen-containing gaseous mixture as oxygen ions migrate to the low oxygen partial pressure side of the solid-state membrane while an electron flux occurs in the opposite direction of oxygen ion migration in order to conserve charge, producing pure oxygen on the permeate side of the membrane.

A plurality of solid state membranes may be joined together to form a membrane module wherein channels are incorporated into each respective membrane unit in order to facilitate introducing the oxygen-containing gaseous mixture to be separated into the module and recovering the oxygen product from the module. As shall be further described in this Specification, Applicants have discovered that the dense mixed conducting oxide layer spanning the supporting channels is susceptible to mechanical failure when a pressure differential is applied across the solid-state membrane units of the membrane module. Moreover, the channeled layers of the membrane units making up the module are somewhat difficult to fabricate.

Gas separation modules and fuel cells of the prior art are typically operated under conditions such that a near zero pressure differential exists across the membrane cells wherein problems associated with pneumatic integrity are minimized and minor leaks are tolerated to a limited extent between the cells. Moreover, the effective active surface area of the dense mixed conducting separating layer of the individual membranes is restricted by the channeled layers which typically support the dense mixed conducting separating layer of the membranes. These modules must be manifolded in a configuration so that oxygen can exit through the collection channels within each membrane unit.

Fuel cell modules formed from a plurality of cells are well known in the art. Representative fuel cells are disclosed in U.S. Pat. No. 4,490,445 which teaches a solid oxide electrochemical energy converter comprising alternating layers of solid oxide electrolyte plates and electrical conductor plates. Each electrolyte plate includes a coating of a porous oxidizer electrode on a first surface of the electrolyte and a coating of a porous fuel electrode on a second surface of the electrolyte. Each conductor plate includes grooved networks formed by ridges which define gas passages on both surfaces of the conductor plate, such ridges being in electrical contact with the electrode coatings on next adjacent electrolytes. Each conductor plate also possesses a means for tapping electricity from or introducing electricity into the converter. The conductor plates also possess circumferential ridges arranged along the edges of the conductor plate to define gas seals, the ridges being in contact with surface coatings on next adjacent electrolyte plates which surface coatings possess the same composition as that of the electrode coatings.

U.S. Pat. No. 4,791,079 discloses two-layer conducting catalytic ceramic membranes which are suitable for use in a variety of hydrocarbon conversion reactions. The two-layer membrane possesses one layer formed of an impervious mixed ion and electronic conducting ceramic such as yttria stabilized zirconia which is doped with sufficient $CeO_2$ or titanium dioxide to impart electron conducting characteristics to the ceramic. A second layer associated with mixed conducting impervious ceramic is a porous ion conducting layer containing a selective hydrocarbon oxidation catalyst.

A solid electrolyte oxygen pump formed from a plurality of solid-state membranes is presented in U.S. Pat. No. 4,877,506. The oxygen pump possesses electrodes which are shaped to form a plurality of linear, parallel channels on facing surfaces of the electrolyte. The air feed is introduced into the channels formed of the air electrode. Oxygen formed during operation of the device is removed by passage through the electrolyte via channels formed of the oxygen electrode or anode. A monolithic array is formed by situating an interconnecting material between adjacent cells to form a stack of cells.

U.S. Pat. No. 5,034,023 discloses ceramic honeycomb structures which are capable of separating oxygen from an oxygen-containing gaseous mixture. The channeled honeycombs are formed from a solid electrolyte having at least some of the honeycomb channels sealed at one of its faces. The oxygen-containing gas is introduced into a first set of channels at one face of the honeycomb, a first voltage is applied to the interior walls of the channels and a second voltage is applied to the interior walls of the second set of remaining channels thereby creating an electrical potential across the ceramic material separating adjacent channels of the two sets. The electrical potential drives oxygen ions through the channel walls releasing molecular oxygen into the second set of channels which can be collected.

U.S. Pat. No. 5,045,169 discloses an electrochemical device capable of generating oxygen from air upon the application of an electrical current, where a plurality of adjacent electrochemical cells are electrically connected in series, each cell containing an inner, porous oxygen electrode; a dense, solid oxide electrolyte capable of transporting oxygen ions partly disposed on top of the inner electrode and partly disposed between inner electrodes of adjacent cells; an outer porous air electrode disposed on top of the electrolyte; and separate, dense, electronically conductive segments of interconnection material disposed between adjacent cells, the interconnection electrically and physically connecting the outer air electrode from one cell to the inner oxygen electrode from an adjacent cell, the device having gas impermeable, dense, contacting segments of electrolyte and interconnection material between inner electrode of adjacent cells.

U.S. Pat. No. 5,240,480 discloses representative solid-state membranes for separating oxygen from oxygen-containing gaseous mixtures. These membranes comprise a multicomponent metallic oxide porous layer having an average pore radius of less than about 10 micrometers and a multicomponent metallic oxide dense layer having no connected through porosity wherein the porous layers and dense layers are contiguous and such layers conduct electrons and oxygen ions at operating temperatures.

U.S. Pat. No. 5,356,728 and European Patent Application WO 94/24065 disclose cross-flow electrochemical reactor cells formed from multicomponent metallic oxides of the perovskite structure which demonstrate electron conductivity and oxygen ion conductivity at elevated temperatures. Such cells are useful in carrying out partial oxidation reactions of organic compounds to form added-value products and separating oxygen from oxygen-containing gaseous mixtures.

The cross-flow reactor cells of U.S. Pat. No. 5,356,728 comprise either a hollow ceramic blade positioned across a gas stream flow containing one or more channels for flow of gas streams or a stack of crossed hollow ceramic blades containing one or more channels for flow of gas streams. Each channel has at least one channel wall disposed between a channel and a portion of an outer surface of the ceramic blade or a common wall with adjacent blades in a stack comprising a gas impervious multicomponent metallic oxide, typically of a perovskite structure, which exhibits electron conductivity and oxygen ion conductivity at elevated temperatures. Thus, the channels are contiguous to the outer surface of the ceramic blade which is formed from the multicomponent metallic oxide.

Industry is searching for solid-state membrane modules which are suitable for conducting a wide variety of processes and reactions wherein the modules would exhibit improved pneumatic and structural integrity. Moreover, such modules would desirably be readily fabricated and manifolded and would be capable of withstanding the pressure differential necessary in practicing air separation processes and desirable in practicing partial oxidation processes. Such modules would desirably not possess structural elements such as channels which are in contact with the dense mixed conducting oxide layer because such channels limit the effective active surface area of the dense mixed conducting oxide layer of each membrane unit. Such channels render the membrane units of prior art solid state membrane modules susceptible to mechanical failure when a pressure differential is applied across the membrane units of the module.

BRIEF SUMMARY OF THE INVENTION

The present invention relates to tubular solid-state membrane modules which can be used to carry out a variety of processes including the separating of any ionizable component from a feedstream wherein such ionizable component is capable of being transported through the dense mixed conducting oxide layer of the membrane units making up the membrane modules. For example, the ionizable component may be oxygen present in air wherein oxygen ions are passed through the dense mixed conducting oxide layers of the tubular membrane unit. Hydrogen can also be separated from a feed stream by fabricating the dense mixed conducting oxide layer of each tubular membrane unit from a mixed conducting oxide which is capable of transporting the ionized hydrogen species.

The tubular solid-state membrane modules of the present invention can also be used to carry out a variety of reactions such as oxidative coupling, chemical deoxygenation, oxidative dehydrogenation and the like. For example, the modules can be utilized to produce synthesis gas by oxidation of methane, natural gas or other light hydrocarbons, or to produce unsaturated compounds from saturated hydrocarbon compounds.

The membrane units making up each tubular solid-state membrane module of the present invention possess a channel-free porous support having connected through porosity which is in contact with a contiguous tubular dense mixed conducting oxide layer having no connected through porosity, and optional porous layers and channels which are oriented such that kinetic limitations associated with oxygen transport are dramatically reduced, oxygen flux is substantially improved and the module demonstrates substantially improved pneumatic and structural integrity. While the dense mixed conducting oxide layer is dense, meaning that the layer does not possess a network of pores, minor fissures or holes may be tolerated to a limited extent provided that separation selectivity is not reduced to unacceptable levels.

Applicants have discovered that substantially improved tubular solid-state membrane modules can be fabricated when the channeled layer adjacent to the tubular dense mixed conducting oxide layer of prior art membrane units is eliminated and replaced by a tubular channel-free porous support having connected through porosity. The term, connected through porosity, means that the channel-free porous support has a matrix of pores throughout its three-dimensional structure which is capable of transferring process gases from one side of the porous support to the opposite side of the porous support.

The most general embodiment of the tubular solid-state membrane modules of the present invention comprise a plurality of tubular membrane units, each tubular membrane unit which comprises a channel-free tubular porous support having connected through porosity which is in contact with a contiguous tubular dense mixed conducting oxide layer having no connected through porosity wherein the tubular dense mixed conducting oxide layer is in flow communication with the oxygen-containing gaseous mixture to be separated and wherein the tubular channel-free porous support of each membrane unit is in flow communication with a removal means for discharging oxygen which has been separated from the oxygen-containing gaseous mixture by permeation through the tubular dense mixed conducting oxide layer of each membrane unit and passage into the removal means via the tubular channel-free porous support of each membrane unit. Optionally, one or more channeled structures may be situated contiguous to the tubular porous support on a side opposite the tubular dense mixed conducting oxide layer.

Suitable mixed conducting oxides for fabricating the tubular dense mixed conducting oxide layer and the tubular channel-free porous support of the tubular solid-state membrane units are represented by the formula $A_x A'_{x'} A''_{x''} B_y B'_{y'} B''_{y''} O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $1.1>x+x'+x''>0.9$, $1.1>y+y'+y''>0.9$, and z is a number which renders the composition charge neutral.

Preferably, A, A' or A" of the above-enumerated formula is a Group 2 metal selected from the group consisting of calcium, strontium, barium and magnesium. Preferred mixed conducting oxides are represented by the formula $La_x A'_{x'} Co_y Fe_{y'} Cu_{y''} O_{3-z}$ wherein $1.1>x+x'>0.9$, $1.1>y+y'+y''>0.9$ with the proviso that $0<y'\leq0.4$ and $0<y''\leq0.4$, and A' is selected from strontium, barium or calcium and magnesium. Again, z is a number which renders the composition charge neutral.

Alternately, suitable mixed conducting oxides for fabricating the tubular dense mixed conducting oxide layer and the tubular channel-free porous support of the tubular membrane units can be formed from a mixture of one or more ionically-conducting compositions and one or more electron-conducting compositions to form a composite which possesses mixed conductivity, meaning that the composite conducts ions and electrons under operating conditions.

The tubular channel-free porous support of each tubular solid-state membrane unit may also be fabricated from an inert material in the sense that the material does not conduct oxygen ions and/or electrons at process operating conditions, an ionically conducting material, an electronically conducting material or a mixed conducting oxide material of the same or different composition with respect to the dense mixed conducting oxide layer of the membrane module. Preferably, the tubular channel-free porous support is fabricated from a mixed conducting oxide material having thermal expansion properties which are compatible with the tubular dense mixed conducting oxide layer and any additional layers or components of the tubular solid-state membrane unit. The compositions making up the respective layers should be selected from materials which do not adversely chemically react with one another under process operating conditions.

Representative materials for fabricating the tubular channel-free porous support which are not mixed conducting under process operating conditions, meaning that such materials do not conduct both oxygen ions and electrons at elevated temperatures, include alumina, ceria, silica, magnesia, titania, a high temperature oxygen compatible metal alloy, a metal oxide stabilized zirconia and compounds and mixtures thereof.

The thickness of the channel-free porous support, the porosity and the average pore diameter of the porous material making up the tubular porous support of each tubular membrane unit can be varied to ensure sufficient mechanical strength of the membrane unit. The tubular channel-free porous support preferably possesses pores having a diameter of less than 5 times the thickness of the tubular dense mixed conducting oxide layer. The tubular dense mixed conducting oxide layer of each membrane unit typically has a thickness ranging from 0.01 micrometer to about 500 micrometers.

In an alternate embodiment of the invention, one or more tubular membrane units of the tubular solid-state membrane module further comprise a tubular porous layer situated contiguous to the tubular channel-free porous support on a side opposite the tubular dense mixed conducting oxide layer. The membrane units can further comprise one or more additional tubular porous layers which are situated contiguous to the first tubular porous layer on the side opposite the tubular channel-free porous support. The respective tubular porous layers may be fabricated such the porous layers have successively larger average pore radii as a function of distance away from the tubular dense mixed conducting oxide layer. The use of a plurality of tubular porous layers has been found to improve mass transfer characteristics of the tubular solid state membrane module.

The porous layers of the tubular membrane units possess connected through porosity and may be fabricated from an inert material as previously described, meaning a material which does not conduct oxygen ions and electrons at operating temperatures, an ionically-conducting material, an electron-conducting material or a mixed conducting metallic oxide as described with respect to the channel-free porous support and the dense mixed conducting oxide layer.

The desired thickness of each tubular porous layer is regulated by the following considerations. First, the porosity and average pore radius of each tubular porous layer should be regulated such that oxygen flux is not impeded while maintaining sufficient mechanical strength. Second, the pores or pore network within each tubular porous layer should be wide enough so that oxygen flux is not impeded, but not so wide as to cause sagging of the dense mixed conducting oxide layer during fabrication and operation. Third, each tubular porous layer should be compatible with each adjacent layer in terms of chemical reactivity, adhesion and thermal expansion to reduce problems associated with cracking and delamination of the contiguous layers of each tubular solid-state membrane unit.

In another alternate embodiment, the membrane units possessing one or more porous layers may further comprise a channel which is situated contiguous to the porous support or one or more tubular porous layers on a side opposite the tubular channel-free porous support. Optionally, the membrane unit may possess additional channeled layers which are situated contiguous to the first channeled layer on a side opposite the one or more tubular porous layers.

The channels may be fabricated in a wide variety of shapes, in cross-section, such as rectangular, trapezoidal, semi-circular and the like. The depth and spacing of the channels may be widely varied and optimum designs may be assessed for a given application without undue experimentation. The channeled layer may be partially or totally replaced by means for minimizing gas phase diffusion resistance. A suitable means comprises a repeating network of isolated cylindrical, conical or rectangular pins designed to distribute gas flow while minimizing pressure drop during operation and to distribute and transfer mechanical load through the structure.

In another embodiment of the present invention, any of the membrane unit embodiments can be further modified by placing a catalyzed layer contiguous to the tubular dense mixed conducting oxide layer on a side opposite the tubular channel-free porous support or contiguous to the surface of the membrane unit which is placed in flow communication with a process stream. Catalysts to be deposited onto the enumerated surface of the dense mixed conducting oxide layer of the tubular solid-state membrane modules of this invention include any material which catalyzes the dissociation of oxygen molecules to oxygen ions. Suitable catalysts include metals and oxides of metals selected from Groups II, V, VI, VII, VIII, IX, X, XI, XV and the F Block lanthanides of the Periodic Table of the Elements according to the International Union of Pure and Applied Chemistry. Suitable metals include platinum, palladium, ruthenium, gold, silver, bismuth, barium, vanadium, molybdenum, cerium, praseodymium, cobalt, rhodium and manganese.

The tubular solid-state membrane modules of this invention can conveniently be used to separate oxygen from an oxygen-containing gaseous mixture or to partially oxidize an oxidizable compound wherein the tubular dense mixed conducting oxide layer of each membrane unit is placed in flow communication with the oxygen-containing gaseous mixture to be separated or is placed in flow communication with a feedstock to be partially oxidized to produce synthesis gas or other partially oxidized products.

When an oxygen partial pressure difference is created on opposite sides of the tubular dense mixed conducting oxide layer of each membrane unit, oxygen ions are transported through the tubular dense mixed conducting oxide layer, the oxygen ions recombine into molecules on the opposite side of the tubular dense mixed conducting oxide layer and the oxygen molecules are transported into the contiguous tubular channel-free porous support which resides at a lower oxygen partial pressure. The tubular porous support is in flow communication with a means for discharging oxygen from the channel-free porous support of each membrane unit and out of the module.

A wide variety of structures can be used as a removal means for discharging oxygen or other process gases from the tubular solid-state membrane modules because the channel-free tubular porous support of each membrane unit possesses a network of pores throughout its three dimensions such that the removal means for discharging oxygen or other process streams from each tubular solid-state membrane unit can be situated at any point of contact with the channel-free porous support of each membrane unit.

For example a suitable removal means for discharging oxygen from the membrane module comprises one or more manifolds which are placed in flow communication with the tubular channel-free porous support of each membrane unit in order to collect oxygen which permeates through the tubular dense mixed conducting oxide layer and passes into the tubular channel-free porous support and out into one or more manifolds for collection or use in other process streams. An alternate removal means comprises one or more conduits which traverse the respective membrane units of the tubular solid-state membrane module at any position of the module provided that such conduits are in flow communication with the channel-free porous support of each membrane unit.

The term, traverse, means that a conduit is placed in flow communication with each tubular membrane unit via a structure which is impervious to gases other than oxygen. The conduit does not necessarily pass through each tubular membrane module unit, but merely connects each tubular membrane unit. When the conduit does not pass through each respective membrane unit, each membrane unit possesses a void space from which oxygen which has been separated from each membrane unit can pass out of each successive membrane unit and be collected via the conduit.

The removal means for discharging oxygen from the tubular solid-state membrane module can be fabricated from the same materials used to form the tubular dense mixed conducting oxide layer as well as the tubular porous support, provided that the selected material is impervious to gases other than oxygen, although the material may also be impervious to oxygen. Specifically, the removal means, two examples which include manifolds and conduits, must be incapable of permeating gases other than oxygen contained in the oxygen-containing gaseous mixture. For example, when the tubular solid-state module is utilized to separate oxygen from an oxygen-containing gaseous mixture, the removal means must form a barrier between components other than oxygen contained in oxygen-containing gaseous mixture and the oxygen product.

Applicants have discovered a new class of mixed conducting oxides which provide unexpectedly low CTE (coefficient of thermal expansion) values and are particularly suited toward use in the dense mixed conducting oxide layer as well as the channel-free porous support of the tubular solid-state membrane units of the present modules. The mixed conducting oxides are represented by the formula $La_xSr_{x'}Co_yFe_{y'}Cu_{y''}O_{3-z}$ wherein $1.1>x+x'>0.9$, $1.1>y+y'+y''>0.9$ with the proviso that $0<y'\leq 0.4$ and $0<y''\leq 0.4$, and A' is selected from strontium, barium, calcium and magnesium. Again, z is a number which renders the composition charge neutral.

The tubular mixed conducting oxide dense layer is preferably formed from a mixed conducting oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$, $La_{0.2}Ba_{0.8}Co_{0.6}Cu_{0.2}Fe_{0.2}O_{3-z}$, $La_{0.2}Sr_{0.8}Co_{0.4}Fe_{0.4}Cu_{0.2}O_{3-z}$, $La_{0.4}Sr_{0.6}Co_{0.4}Fe_{0.4}Cu_{0.2}O_{3-z}$, $La_{0.3}Sr_{0.7}Co_{0.8}Fe_{0.1}Cu_{0.1}O_{3-z}$ and $SrCo_{0.4}Fe_{0.4}Cu_{0.2}O_{3-z}$ where z is a number which renders the composition charge neutral. Alternately, the tubular dense layer can be formed of a mixture of one or more ionically conducting materials and one or more electron-conducting materials.

The tubular solid-state modules of the present invention can be used to recover oxygen from an oxygen-containing gaseous mixture by contacting the oxygen-containing gaseous mixture with the dense mixed conducting oxide layers of the tubular solid-state membrane units, establishing a positive oxygen partial pressure difference on opposite sides of the tubular dense mixed conducting oxide layers of each membrane unit by producing an excess oxygen partial pressure in the feed side of the membrane unit and/or by producing a reduced oxygen partial pressure on the permeate side of the membrane unit; contacting the oxygen-containing gaseous mixture with the dense mixed conducting oxide layer of the membrane units at a temperature greater than about 300° C. to separate the oxygen-containing gaseous mixture into an oxygen permeate stream. The oxygen permeate stream passes through the tubular channel-free porous support of each membrane unit and is subsequently collected by the removal means for discharging the oxygen product. The oxygen-depleted gaseous mixture can be recycled into the process or transferred to another process to recover its heat value, or further heated and passed through an expander.

The oxygen which has been separated from the oxygen-containing gaseous mixture can be collected or can be reacted in-situ with an oxidizable composition to form a partially oxidized product. Suitable oxygen-containing gaseous mixtures include air or any gaseous mixture containing molecular oxygen or other sources of oxygen such as $N_2O$, NO, $NO_2$, $SO_2$, $CO_2$ and the like.

The tubular solid-state membrane modules of the present invention can also be used to carry out a variety of reactions such as oxidative coupling, chemical deoxygenation, oxidative dehydrogenation and the like. For example, the modules can be utilized to produce synthesis gas by oxidation of methane, natural gas or other light hydrocarbons, or to produce unsaturated compounds from saturated hydrocarbon compounds. According to this embodiment, an oxygen-containing gaseous mixture is introduced into the channel-free porous support of the membrane unit and the gas to be oxidized is placed in contact with the dense mixed conducting oxide layer of each membrane unit of the membrane module. At operating temperatures in excess of 300° C., oxygen is reduced to oxygen ions which are transported across the dense mixed conducting oxide layer to the exterior surface of the membrane unit. The feedstream to be oxidized is placed in flow communication with the exterior surface of the dense mixed conducting oxide layer of membrane unit wherein oxygen ions react with a desired feedstock thereby oxidizing the feedstock and releasing electrons which are transported across the dense mixed conducting oxide layer in a direction opposite the flow of oxygen ions.

The tubular solid-state membrane modules of the present invention can be conveniently utilized to remove trace amounts of oxygen from an oxygen-containing gaseous mixture such as crude argon wherein the gaseous mixture is contacted with the dense mixed conducting oxide layer of each membrane unit and a reducing gas such as hydrogen or methane is contacted with the channel-free porous support wherein the oxygen residing in the gaseous mixture is converted to water or water and carbon dioxide, respectively. The oxygen-containing gaseous mixture which is depleted in oxygen is conveniently collected at pressure.

When the tubular solid-state membrane modules of the present invention are utilized for carrying out the above-mentioned partial oxidation reactions, a catalyst suitable for carrying out the desired reaction is typically situated contiguous to the dense mixed conducting oxide layer of the membrane units on a side opposite the channel-free porous support. Suitable reactants and partial oxidation catalysts are well known in the art.

Applicants' invention can be more readily understood by referring to the Detailed Description of the Invention and the Figures which are attached hereto.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
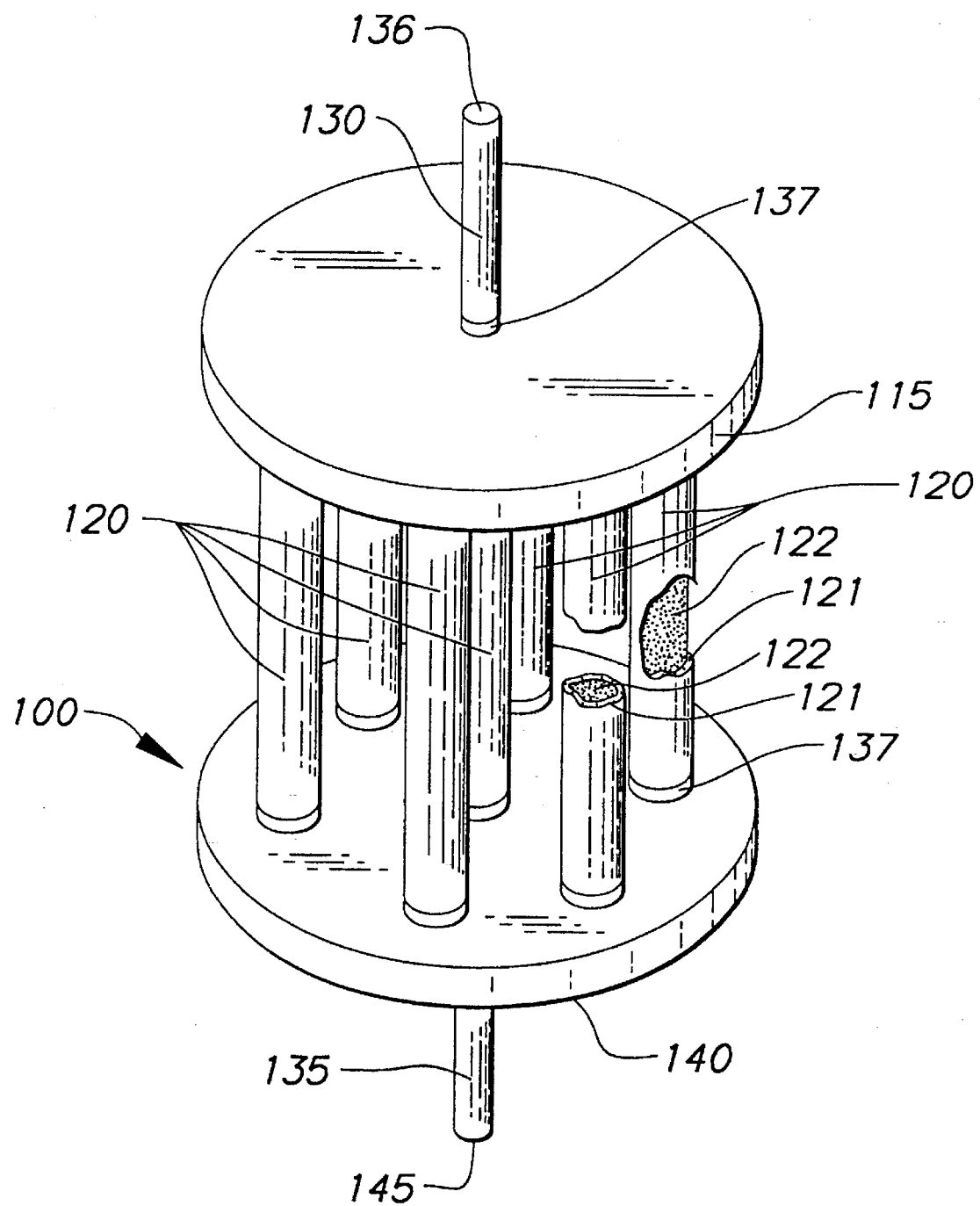
FIG. 1 is a perspective view of an embodiment of a tubular solid-state membrane module which comprises a plurality of tubular membrane units formed from a tubular dense mixed conducting oxide layer which is supported by and contiguous with a tubular channel-free porous support having connected through porosity. The removal means for discharging oxygen from each tubular membrane unit comprises two manifolds.

FIG. 1 is an exploded perspective view of an embodiment of a tubular solid-state membrane module comprising a plurality of tubular membrane units. Tubular solid-state membrane module 100 comprises an array of gas separation membrane units 120 which are separated to allow process gases to contact the surfaces of such membrane units. Each membrane unit 120 comprises a channel-free porous support 122 and a dense mixed conducting oxide layer 121. Structures 115 and 140 adjacent opposite entrance and exit surfaces of tubular membrane units possess receiving structures (not shown) into which membrane units 120 are received. Thus, structures 115 and 140 (referred to as manifolds) are in flow communication with channel-free porous supports 122 of each membrane unit 120 of the solid-state membrane module. Lines 130 and 135 are in flow communication with structures 115 and 140 and are adapted to carry process streams to and from the tubular solid-state membrane module 100. Conduit collars 137 provide a gas-tight seal between manifold structure 115 and conduit 130, manifold structure 140 and conduit 135 as well as opposing ends of tubular solid-state membrane units 120 and manifold structures 115 and 140.

The embodiment according to FIG. 1 can be conveniently utilized to separate oxygen from an oxygen-containing gaseous mixture by contacting the oxygen-containing gaseous mixture with the dense mixed conducting oxide layers 121 of each of the membrane units 120. The driving force for separating oxygen from an oxygen-containing gaseous mixture is provided by creating a difference in oxygen partial pressure on opposite sides of the dense mixed conducting oxide layer 121 of each membrane unit 120.

An oxygen partial pressure difference on opposite sides of dense mixed conducting oxide layer 12 1 can be created by compressing the oxygen-containing gaseous mixture to a pressure sufficient to recover the oxygen permeate stream at a pressure of greater than or equal to about one atmosphere. Typical pressures range from about 75 psia to about 250 psia and the optimum pressure will vary depending upon the amount of oxygen in the oxygen-containing gaseous mixture. Conventional compressors are capable of achieving the required compression. Alternately or in combination with use of compression, a positive oxygen partial pressure difference on opposite sides of dense mixed conducting oxide layer 121 can be achieved by partially evacuating the channel-free porous support 122 by drawing a vacuum on inlets 136 or 145 of conduits 130 and 135 to create a partial pressure difference sufficient to recover the oxygen product.

The oxygen which has been separated from the oxygen-containing gaseous mixture can be stored in a suitable container or utilized in another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

The tubular solid-state membrane modules of the present invention can be used to carry out a variety of processes including the separating of any ionizable component from a feedstream wherein such ionizable component is capable of being transported through the dense mixed conducting oxide layer of the membrane units. For example, the ionizable component may be oxygen present in air wherein oxygen ions are passed through the dense mixed conducting oxide layers of the tubular membrane units. Hydrogen can also be separated from a feed stream by fabricating the dense mixed conducting oxide layer of each membrane unit from a mixed conducting oxide which is capable of transporting the ionized hydrogen species.

The membrane module 100 depicted in FIG. 1 can be readily utilized to produce synthesis gas. The tubular solid-state membrane module 100 is heated to a temperature ranging from 300° to 1200° C., preferably from 500° to 900° C. The upper operating temperature is limited only by the temperature at which the composition of the membrane unit begin to sinter. A feedstock comprising light hydrocarbons such as methane, natural gas, ethane or any available light hydrocarbon mixture is placed in contact with the dense mixed conducting oxide layers 121 of membrane units 120 and an oxygen-containing gaseous mixture is introduced into the channel-free porous supports 122 of each membrane unit 120 by passage into either structure 130 or structure 135 via inlets 136 or 145, respectively. The oxygen-containing gaseous mixture flows into the channel-free porous supports 122 of each membrane unit 120 wherein oxygen is ionized and passed across the dense mixed conducting oxide layer 121 of each membrane unit 120. The feedstock contacts oxygen ions which are formed at the surface of dense mixed conducting oxide layer 121 resulting in formation of synthesis gas.

The feedstock to be utilized in carrying out the synthesis gas reaction is preferably natural gas which may be utilized straight from the wellhead at pressure or produced industrially by making a composition having about 70 percent by weight of methane, about 10 percent by weight of ethane, 10 percent to 15 percent by weight of carbon dioxide with the balance comprising smaller amounts of propane, butane and nitrogen. The feedstock may also comprise a mixture of $C_1$–$C_6$ hydrocarbons which may optionally be diluted with any inert diluent such as nitrogen, helium and the like. Suitable catalysts include conventional catalysts for producing synthesis gas as are well known in the art.

The tubular solid-state membrane module according to FIG. 1 may also be utilized to produce unsaturated hydrocarbons. The process is conducted in a manner analogous to the preparation of synthesis gas wherein the membrane module 100 is heated to a temperature in excess of 300°, preferably from 500° to 1000° C. Thus, the feedstock and oxygen-containing gaseous mixture are passed through the tubular solid-state membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms and aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts which may be placed on the dense mixed conducting oxide layer on each membrane unit on a side opposite the channel-free porous support include Shell 105 catalyst which comprises about 90% iron oxide, 4% chromium oxide and 6% potassium carbonate.

Figure 2:
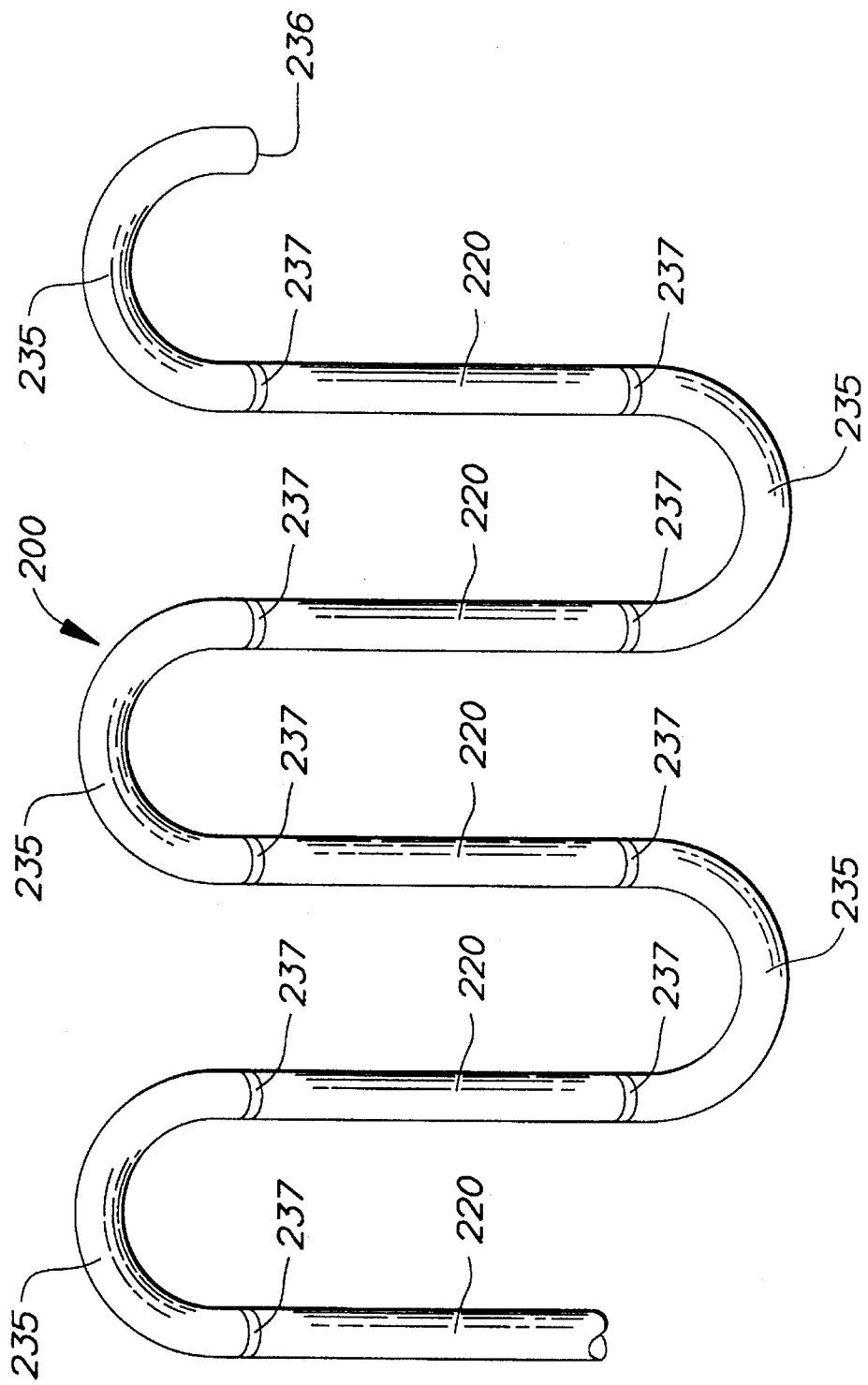
FIG. 2 is a perspective view of an alternate embodiment of a tubular solid-state membrane module which comprises a plurality of tubular membrane units formed from a tubular dense mixed conducting oxide layer which is supported by and contiguous with a tubular channel-free porous support having connected through porosity. The removal means for discharging oxygen from each tubular membrane unit comprises a plurality of conduits which are in flow communication with the channel-free porous support of each membrane unit of the solid-state membrane module.

FIG. 2 presents a perspective view of an alternate embodiment of the present invention which comprises an array of tubular solid-state membrane units 220 wherein each membrane unit comprises a tubular dense mixed conducting oxide layer (not shown) which is supported by and contiguous with a channel-free porous support (not shown) having connected through porosity. The plurality of tubular solid-state membrane units 220 are connected together via a plurality of conduits 235 wherein such conduits are placed in flow communication with the tubular channel-free porous support of each membrane unit 220. Each membrane unit 220 is secured to connecting conduits 235 by seal 237. Thus, conduit inlet 235 is in flow communication with the porous support of each tubular membrane unit 220.

Seals 237 provide a gas-tight seal between conduits 235 and tubular membrane units 220 thereby preventing leakage of oxygen or other gases from within the tubular membrane units 220 or between adjacent tubular membrane units 220. Seals 237 can be chosen from a wide variety of materials including oxidation-resistant ceramics having a thermal expansion coefficient which is compatible with the respective layers of tubular solid state membrane units 220 with which the respective seals 237 are associated. The seals 237 may be formed from any suitable mixed conducting oxide material. Other suitable materials include any inert material having an acceptable, thermal expansion coefficient such as stainless steel or forsterite (a composite magnesium silicate oxide). Seals 237 may be secured to conduits 235 and tubular membrane units 220 by co-sintering or by applying a high temperature material such as an aluminosilicate glass, metal braze, or composites of both.

The embodiment 200 according to FIG. 2 can be conveniently utilized to separate oxygen from an oxygen-containing gaseous mixture by contacting the dense mixed conducting layer of each tubular membrane units 220 with an oxygen-containing gaseous mixture. The driving force for separating oxygen from an oxygen-containing gaseous mixture is provided by creating a difference in oxygen partial pressure on opposite sides of the dense mixed conducting oxide layer of each membrane unit 220. An oxygen partial pressure difference on opposite sides of the dense mixed conducting oxide layer of each tubular membrane unit 220 can be created by compressing the oxygen-containing gaseous mixture to a pressure sufficient to recover the oxygen permeate stream at a pressure of greater than or equal to about one atmosphere. Typical pressures range from about 75 psia to about 250 psia and the optimum pressure will vary depending upon the amount of oxygen in the oxygen-containing gaseous mixture. Conventional compressors are capable of achieving the required compression. Alternately, a positive oxygen partial pressure difference on opposite sides of dense mixed conducting oxide layer of each tubular membrane unit 220 can be achieved by partially evacuating the channel-free porous support by drawing a vacuum on inlet 236 to create a partial pressure difference sufficient to recover the oxygen product.

The oxygen which has been separated from the oxygen-containing gaseous mixture can be stored in a suitable container or utilized in another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

When the tubular solid-state membrane module of FIG. 2 is utilized for producing synthesis gas, the membrane module is heated to a temperature ranging from 300° to 1200° C., preferably from 500° to 900° C. A feedstock comprising light hydrocarbons such as methane, natural gas, ethane or any available light hydrocarbon mixture is contacted with the dense mixed conducting oxide layer of each membrane unit 220 and an oxygen-containing gaseous mixture is introduced into the channel-free porous supports of each membrane unit 220 by passage through conduits 235 via conduit inlet 236. The oxygen-containing gaseous mixture flows into the channel-free porous support of each tubular membrane unit 220 wherein oxygen is ionized and passed across the dense mixed conducting oxide layer of each tubular solid-state membrane unit 220. The feedstock contacts oxygen ions which are formed at the surface of the respective dense mixed conducting oxide layers resulting in formation of synthesis gas. The synthesis gas is collected in a conventional manner.

The feedstock to be utilized in carrying out the synthesis gas reaction is preferably natural gas which may be utilized straight from the wellhead or produced industrially by making a composition having about 70 percent by weight of methane, about 10 percent by weight of ethane, 10 percent to 15 percent by weight of carbon dioxide with the balance comprising smaller amounts of propane, butane and nitrogen. The feedstock may optionally be diluted with any inert diluent such as nitrogen, helium and the like. Suitable catalysts include conventional catalysts for producing synthesis gas as are well known in the art.

The membrane module according to FIG. 2 may also be utilized to produce unsaturated hydrocarbons. The process is conducted in a manner analogous to the preparation of synthesis gas wherein the membrane module is heated to a temperature in excess of 300° C., preferably from 500° to 1000° C. Thus, the feedstock and oxygen-containing gaseous mixture are passed through the membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms and aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts include Shell 105 catalyst which comprises about 90% iron oxide, 4% chromium oxide and 6% potassium carbonate.

Figure 3:
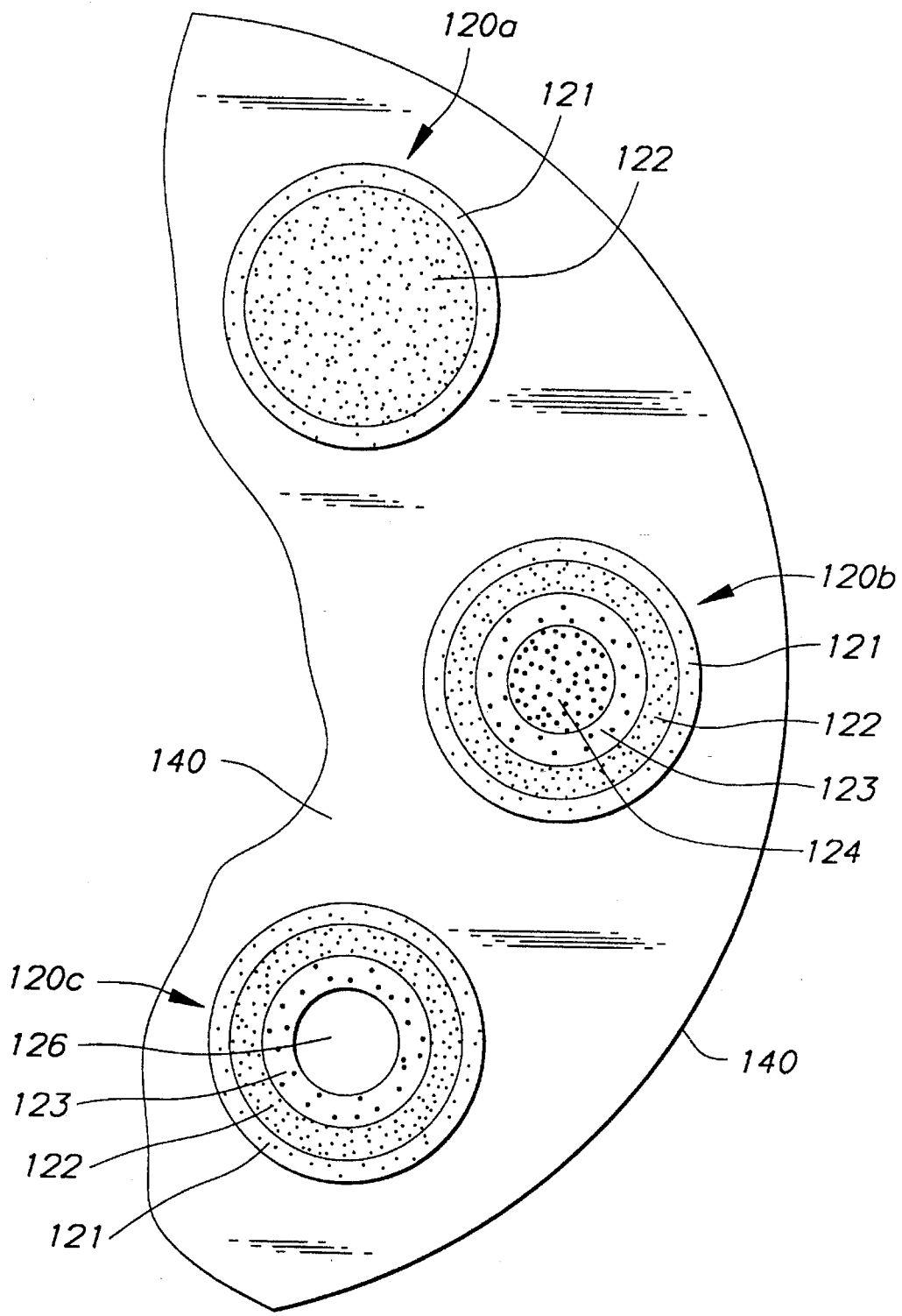
FIG. 3 is a sectional view of the tubular solid-state membrane module of FIG. 1 which illustrates three tubular membrane unit embodiments, each embodiment which comprises a tubular dense mixed conducting oxide layer which is supported by a tubular channel-free porous support having connected through porosity.

FIG. 3 presents a sectional view of the tubular solid-state module of FIG. 1 and illustrates three membrane unit embodiments which are suitable for practicing the present invention. Referring to FIG. 3, membrane units 120a, 120b, and 120c each possess a tubular dense mixed conducting oxide layer 121 which is situated contiguous to tubular channel-free porous support 122. Thus, tubular membrane unit 120a represents the most general membrane unit of the tubular solid-state modules of the present invention.

Membrane unit 120b of FIG. 3 presents an alternate embodiment of a tubular solid-state membrane unit which comprises a dense mixed conducting oxide layer 121 which is contiguous to support layer 122. Situated adjacent to and contiguous with the support layer 122 is a first porous layer 123 and a second porous layer 124. The second porous layer 124 forms the interior portion of the membrane unit 120b onto which a first porous layer 123 is deposited followed by the other respective layers. Thus, first and second porous layers 123 and 124 and channel-free porous support 122 provide an integral support for the dense mixed conducting oxide layer 121 which can withstand the pressure differential exerted on opposite sides of the dense mixed conducting layer 121 of membrane unit 120b when operated at temperature and pressure.

The first porous layer 123 and the second porous layer 124 of membrane unit 120b can be individually deposited such that the second porous layer 124 has a larger average pore radii than the first porous layer 123. Any number of porous layers can be used such that the respective porous layers form a gradient having an average pore radius which increases moving away from the interface with channel-free porous support 122. Alternately, the membrane unit 120b can be fabricated such that each respective porous layer has an average pore radius which progressively increases as a function of distance from the channel-free porous support. A preferred technique for depositing the dense mixed conducting oxide layer 121 onto porous support 122 is presented in U.S. Pat. No. 5,332,597 issued Jul. 24, 1994, which is assigned to Air Products and Chemicals, Inc., Allentown, Pa.

Membrane unit 120c represents an adaptation of membrane unit 120b wherein the second porous layer 124 of membrane unit 120b is replaced by a channel 126. The channel can be formed by conventional extrusion techniques. When the tubular solid-state membrane module is operated to separate oxygen from an oxygen-containing gaseous mixture, oxygen permeates dense mixed conducting oxide layer 121 and passes through channel-free porous support 122 and porous layer 123 into channel 126 for collection via inlets 136 and 145 of structures 130 and 135 as presented in FIG. 1.

Figure 4:
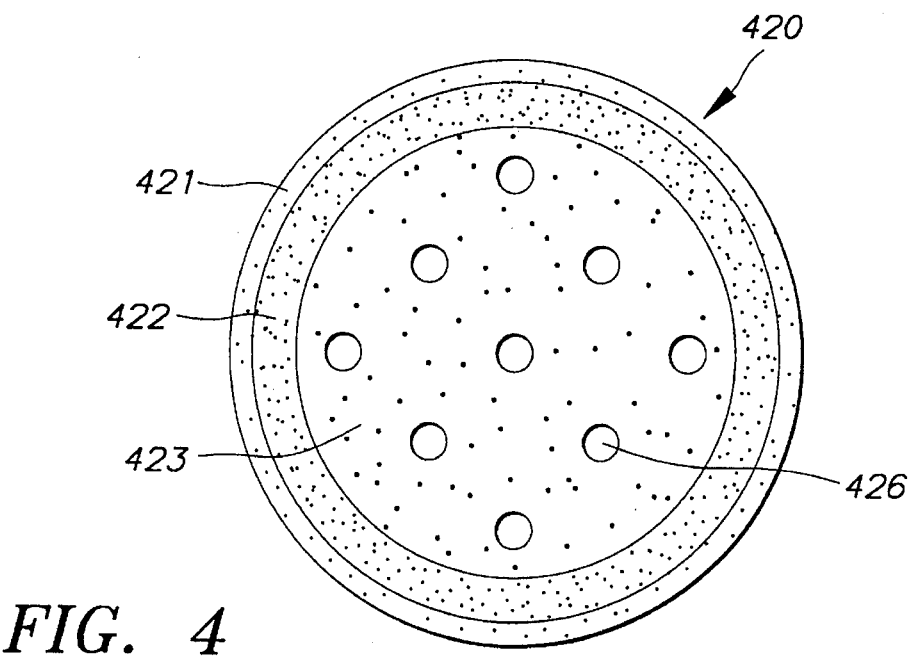
FIG. 4 is a sectional view of a preferred tubular membrane unit which is suitable for incorporation into the tubular solid-state membrane modules illustrated in FIGS. 1 and 2.

FIG. 4 presents an alternate embodiment of a tubular solid-state membrane unit 420 which is suitable for incorporation into the solid-state membrane modules of FIGS. 1 and 2. Tubular dense mixed conducting oxide layer 421 is contiguous to tubular channel-free support layer 422. Situated adjacent to and contiguous with the porous support 422 is a porous layer 423. Tubular channel-free porous support 422 and porous layer 423, respectively, provide an integral support for the dense mixed conducting oxide layer 421 which can withstand the pressure differential exerted on opposite sides of the membrane unit under operating conditions. Porous layer 423 further possesses a plurality of channels 426 which are formed continuously through the length of the porous layer 423 and are adapted to receive oxygen which has permeated through tubular dense mixed conducting oxide layer 421, porous support 422 and porous layer 423. The channels 426 can be prepared by conventional extrusion techniques.

Figure 5:
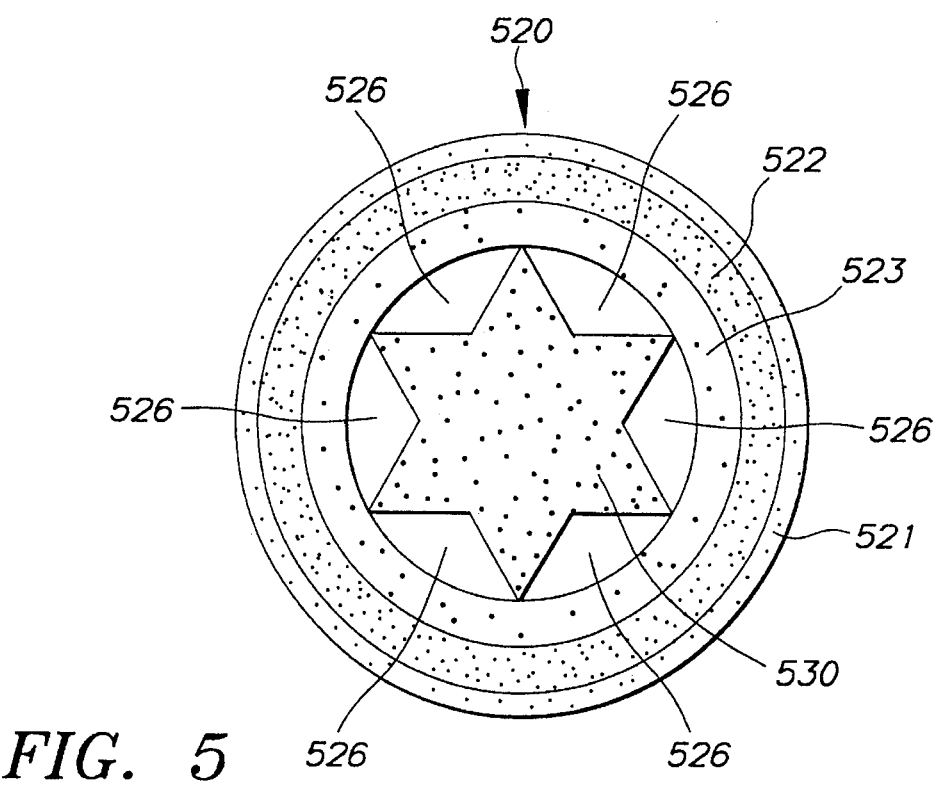
FIG. 5 is a sectional view of a preferred tubular membrane unit which is suitable for incorporation into the tubular solid-state membrane modules illustrated in FIGS. 1 and 2.
Figure 6:
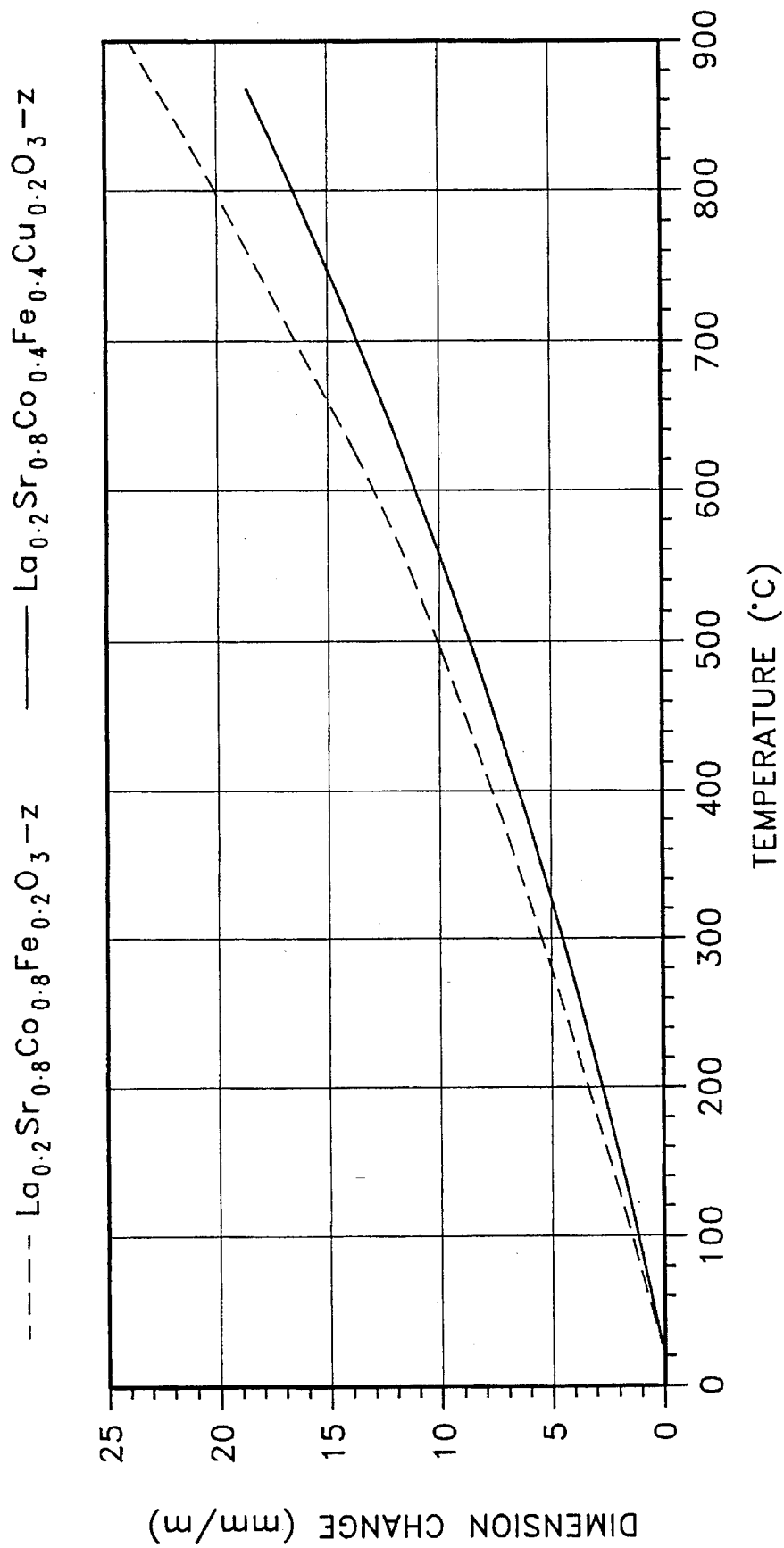
FIG. 6 illustrates the dimensional changes of a preferred mixed conducting oxide, $La_{0.2}Sr_{0.8}Co_{0.4}Fe_{0.4}Cu_{0.2}O_{3-z}$, as a function of temperature thereby illustrating unexpectedly improved control of the coefficient of thermal expansion when copper is introduced into the perovskite structure.

FIG. 5 presents another alternate embodiment of a tubular solid-state membrane unit 520 which is suitable for incorporation into the solid-state membrane modules of FIGS. 1 and 2. Dense mixed conducting oxide layer 521 is contiguous to a channel-free porous support 522. Situated adjacent to and contiguous with the channel-free porous support is a first porous layer 523 and a second porous layer 530 which is a structure of any conventional geometry having at least two points of contact with the first porous layer 523. Channel-free porous support 522 and first and second porous layers 523 and 530 respectively, provide an integral support for the dense mixed conducting oxide layer 521 which can withstand the pressure differential exerted on opposite sides of the membrane unit under operating conditions. Channels 526 are formed between adjacent points of contact between first porous layer 523 and second porous layer 530. Channels 526 are adapted to receive oxygen which has permeated through tubular dense mixed conducting oxide layer 521 and porous support 522. Channels 526 can be prepared by conventional extrusion techniques.

Having described in detail the embodiments of the tubular membrane modules which Applicants regard as their invention, the following information is provided to further describe the membrane units which form the membrane modules as well as the materials and methods for making the same.

Thin dense mixed conducting oxide layers of the desired multicomponent metallic oxide having a thickness ranging from 100 microns to about 0.01 microns in thickness can be deposited onto the enumerated porous supports by conventional techniques. A preferred technique for manufacturing ultrathin solid state membranes is presented in U.S. Pat. No. 5,160,618 issued Nov. 3, 1992, which is assigned to Air Products and Chemicals, Inc., Allentown, Pa. The tubular solid-state membrane units can be manufactured by first forming a porous body from relatively coarse sized particles of the multicomponent metallic oxide. A slurry of finer particles of the same material or a similar, compatible multicomponent metallic oxide may then be coated onto the porous support and cured to the green state, the two layer system then being fired to form the solid-state membrane unit.

The contiguous porous support and dense mixed conducting oxide layer of the present solid-state membrane units may be formed from one or more multicomponent metallic oxides comprising an oxide of at least two different metals or a mixture of at least two different metal oxides wherein the multicomponent metallic oxide demonstrates electron conductivity as well as oxygen ion conductivity at elevated temperatures. Multicomponent metallic oxides suitable for practicing the present invention are referred to as "mixed" conducting oxides because such multicomponent metallic oxides conduct electrons as well as oxygen ions at elevated temperatures.

The mixed conducting oxides suitable for practicing the present invention may be prepared according to conventional methods including mixing a desired stoichiometric ratio of the respective metallic oxides making up the mixed conducting oxide, thermally decomposing nitrates and acetates and utilizing the citric acid preparation method. Each of these methods is well known in the art and is suitable for making the mixed conducting oxides of the present invention.

The tubular membrane units of the present invention can be prepared by applying a dense mixed conducting oxide layer of a desired mixed conducting oxide onto the desired porous support by conventional chemical vapor deposition techniques followed by sintering to obtain the desired dense mixed conducting oxide layer. In order to obtain an optimal coating of the desired mixed conducting oxide, a smaller average pore radius in the surface of the channel-free porous support may be used compared to the average pore radius in the bulk. This may be achieved by using two or more porous layers which differ in properties such as pore radius and porosity.

EXPERIMENTAL SECTION

The following examples are provided to further illustrate embodiments of the present invention and are not intended to limit the scope of the attached claims.

EXAMPLE 1

STRESS ANALYSIS OF AN AIR SEPARATION MODULE COMPRISING COMPOSITE MIXED CONDUCTING OXIDE STRUCTURES

Oxygen flux through the tubular membrane units of the modules of this invention created when an oxygen partial pressure gradient exists across the dense mixed conducting oxide layer of each membrane unit is inversely proportional to the thickness of the dense mixed conducting oxide layer membrane when other resistances to the flux such as those due to surface kinetics or gas phase diffusion are minimized. In order to obtain economically attractive rates of oxygen separation from air, the dense mixed conducting oxide layer of each membrane unit must be thin; generally $\leq 100$ μm thick when an oxygen partial pressure gradient of ~40–50 psi is applied across the dense mixed conducting oxide layer of a membrane unit at temperatures in excess of 800° C. When separating pure oxygen from air utilizing the claimed tubular solid-state membrane modules, air at ~200–250 psig is applied to the feed side of the tubular membrane units while oxygen at close to atmospheric pressure is removed from the opposite side of the dense mixed conducting oxide layer resulting in a mechanical load of ~200–250 psi (1.3–1.7 Mpa) being applied across the thickness of the dense mixed conducting oxide layer of the tubular solid-state membrane unit.

The allowable stress that can be applied for a given probability of failure to a ceramic material of known characteristic strength can be calculated by using Weibull statistics. Mixed conducting oxides of the perovskite type are known to have characteristic strengths of the order of 50–150 Mpa. For example, $La_{0.2}Ba_{0.8}Co_{0.8}Fe_{0.2}O_{3-x}$ (LBCF) has a characteristic strength of ~60 Mpa and a Weibull modulus of 10.0 at 800° C. Other mixed conducting oxides may have higher values; for example, the material designated LSFC-2 is stated to have an average strength of 120.4 MPa and a Weibull modulus of 14.5 (U. Balachandran et al., American Ceramic Society Bulletin, volume 74, No. 1, page 71, 1995), from which its characteristic strength can be estimated to be ~124 MPa. The maximum allowable applied stress for these materials can then be calculated as follows:

| Material | Characteristic Strength MPa | Weibull Modulus | Probability of Failure | Allowable Stress MPa |
|---|---|---|---|---|
| LBCF | 60.0 | 10.0 | $10^{-8}$ | 9.5 |
| LBCF | 60.0 | 10.0 | $10^{-10}$ | 6.0 |
| LSCF-2 | 124.0 | 14.5 | $10^{-8}$ | 34.8 |
| LSCF-2 | 124.0 | 14.5 | $10^{-10}$ | 25.3 |

Therefore, to obtain economic oxygen separation rates at practical operating conditions and to ensure useful membrane reliability in service, the maximum allowable stress that can be applied across the enumerated dense mixed conducting oxide layer having a thickness of less than $\leq 100$ μm ranges from 5 to 40 MPa.

The dense mixed conducting oxide layers of the respective tubular solid-state membrane unit which are less than 100 μm in thickness must be supported to withstand the stress imposed by the operating pressure differential. The support must provide sufficient mechanical strength to prevent membrane unit failure under the operating conditions while imposing a minimum resistance to the flow of oxygen that has permeated through the dense mixed conducting oxide layer of each membrane unit. Standard mechanical calculations (Rourk and Young, Formulas for Stress and Strain, McGraw-Hill, 5th Ed., 1975) can be used to estimate the stress imposed on a supported dense mixed conducting oxide membrane layer by an applied pressure differential for various values of the ratio of the supported span dimension to the thickness of the dense mixed conducting oxide layer of the membrane unit. For a membrane unit to withstand an applied pressure differential of ~1.5 MPa, the calculated stress developed in the dense mixed conducting oxide layer is as follows:

| Support Span Dimension/<br>Membrane Thickness | Maximum Imposed Stress<br>in Membrane MPa |
| --- | --- |
| 1:1 | 0.9 |
| 2:1 | 3.2 |
| 3:1 | 7.3 |
| 4:1 | 13.0 |
| 5:1 | 20.3 |
| 6:1 | 29.2 |
| 7:1 | 39.8 |

In order to obtain a viable economic membrane reliability under practical operating conditions, the maximum stress imposed on the membrane unit by the operating pressure gradient must not exceed the maximum allowable stress, which is itself a function of the material properties of the dense mixed conducting oxide layer of the membrane unit. These calculations show that the ratio of span dimension to thickness of the dense mixed conducting oxide layer and support structure must not exceed a range of ~3:1 to 6:1, depending on the strength of the dense mixed conducting oxide layer. The oxygen flux requirement for a membrane unit formed from a dense mixed conducting oxide layer having membrane thickness of $\leq 100$ μm implies a maximum span width in the contiguous porous support adjacent to the dense mixed conducting oxide membrane layer of <300–600 μm.

The porous support must also be economical to fabricate and provide minimum gas flow resistance. An optimum balance of these requirements can be achieved by using a channel-free porous support contiguous with the lower pressure side of the dense mixed conducting oxide membrane layer. Examples of suitable channel-free porous support layers are tape calendered or tape cast porous layers made by incorporating pore formers into the calendered or cast tape, such as carbon, rice flour or organic polymers, which are pyrolyzed from the green ceramic before sintering.

The dense mixed conducting oxide layer of the membrane unit may also be tape cast or tape calendered and bonded to the support in the green state by calendering or lamination under pressure. The dense mixed conducting oxide layer and channel-free porous support may then by sintered as a combined membrane unit in one firing. An alternative channel-free porous support is a ceramic reticulated foam, which may also be bonded to a tape cast or calendered dense mixed conducting oxide layer in the green state.

Alternatively, the dense mixed conducting oxide layer may be fabricated in or on the surface of the channel-free porous support by a combination of dip-coating with a slurry of mixed conducting oxide material followed by sealing the residual porosity of the thin membrane layer by organometallic chemical vapor infiltration as described in U.S. Pat. No. 5,332,597, issued Jul. 26, 1994. To minimize thermomechanical stress due to differential thermal expansion and to eliminate chemical reactivity, the support layer is optimally formed from the same composition as the mixed oxide conducting membrane layer of the membrane unit.

EXAMPLE 2

PREPARATION OF $La_{0.2}Sr_{0.8}Co_{0.4}Fe_{0.4}Cu_{0.2}O_{3-z}$

A membrane module may be fabricated wherein the dense mixed conducting oxide layer of each membrane unit is formed from $La_{0.2}Sr_{0.8}Co_{0.4}Fe_{0.4}Cu_{0.2}O_{3-z}$. This composition was prepared by a known powder preparation technique wherein 2.05 parts by weight of $La_2O_3$, 7.42 pans by weight of $SrCO_3$, 1.88 parts by weight of $CoO$, 2.01 parts by weight of $Fe_2O_3$ and 1.00 parts by weight of $CuO$ was balled milled for 12 hours. The mixture was then fired in air to 1000° C. for 24 hours followed by cooling to room temperature. The mixture was then ground by ball milling, remixed and retired in air to 1000° C. for 24 hours followed by cooling to room temperature. The material possessed a perovskite crystal structure as determined by X-ray diffraction. The perovskite was air milled to ~1–5 μm particle size, and combined with a plasticizer, binder and toluene solvent to form a slip suitable for tape casting.

This composition as well as compositions represented by the generalized formula $La_xA'_{x'}Co_yFe_{y'}Cu_{y''}O_{3-z}$ wherein $1.1 > x+x' > 0.9$, $1.1 > y+y'+y'' > 0.9$, $0 < y' \leq 0.4$ and $0 < y'' \leq 0.4$, A' is selected from strontium, barium or calcium, and z is a number which renders the mixed conducting oxide charge neutral, exhibit unexpectedly low changes in expansion as a function of temperature as evidenced by FIG. 7. FIG. 7 compares the dimension change as a function of temperature for the instant composition versus a similar composition which does not contain copper. The plot shows that the instant composition provides unexpectedly improved control over dimensional change when copper is introduced into a mixed conducting oxide containing cobalt and iron in the enumerated stoichiometry. This unexpected improvement holds over the entire range of compositions contemplated by the generalized formula.

EXAMPLE 3

FABRICATION OF A TUBULAR SOLID-STATE MEMBRANE MODULE BY SLIP CASTING AND EXTRUSION

The tubular solid-state membrane module illustrated in the FIG. 1 comprising a tubular dense mixed conducting oxide layer, a tubular channel-free porous support, plus an additional porous layer adjacent to the porous support and a porous layer containing channels is fabricated utilizing the following procedure:

Step 1: A slip prepared as described in Example 2 is mixed with an organic pore-forming agent and extruded through a die to provide a cylindrical body having a plurality of cylindrical channels or bores parallel to the axis of the cylindrical body as illustrated in FIG. 4. This body is fired at moderate temperatures to pyrolyze the organic pore-forming agent, plasticizer, solvent and binder. The body is fired a second time at a higher temperature sufficient to partially sinter the mixed conducting oxide to produce a tubular porous body comprising a porous layer which possesses cylindrical channels.

Step 2: A second slip is prepared as described above and mixed with additional solvent and a smaller amount of organic pore-forming agent than used in step 1. The porous support produced in step 1 is coated with the second slip using the vacuum infiltration technique described in U.S. Pat. No. 5,332,597. The resulting coated porous layer is fired at moderate temperatures to remove the organic pore-forming agent, plasticizer, solvent and binder and then fired at a still higher temperature to form a two-layered structure comprising a tubular porous layer which porous cylindrical channels which is contiguous to a porous support.

Step 3: A dense mixed conducting oxide layer is deposited onto the surface of the two-layered structure described in step 2 by the following procedure. A third slip is prepared as described above having an average particle size less than about one micron. The coated porous support produced in step 2 is coated with this slip using the vacuum infiltration techniques described in U.S. Pat. No. 5,332,597. The resulting coated porous support is fired at high temperatures to remove the plasticizer, solvent and binder. This body is then fired at still higher temperatures to completely sinter the vacuum infiltrated mixed conducting oxide layer to produce a dense mixed conducting oxide layer which is contiguous to the porous support produced in step 2. The porous support has a smaller average pore radius than the porous layer. Optionally, the dense mixed conducting oxide layer may be deposited onto the surface of the two-layered structure by the organometallic chemical vapor deposition method described in U.S. Pat. No. 5,332,597.

Step 4: The tubular solid-state membrane module depicted in FIG. 1 is made by sealing a plurality of fully fired membrane units as produced in step 3 to two common manifolds formed from a compatible superalloy such as Incolloy 800 series nickel alloy using an aluminosilicate glass ceramic seal or metallic braze seal. The module is heated to 850° C. and air at 250 psig pressure is passed over the exterior surfaces of the tubular solid-state membrane units. A vacuum pump is connected to the common manifolds and >99% pure oxygen is withdrawn from the manifolds.

EXAMPLE 4

FABRICATION OF A TUBULAR SOLID-STATE MEMBRANE MODULE BY SLIP CASTING AND EXTRUSION

The tubular solid-state membrane module illustrated in FIG. 2 comprising a plurality of tubular membrane units comprising a dense mixed conducting oxide layer, a channel-free porous support and a porous layer containing channels is fabricated utilizing the following procedure:

Steps 1–3 described in Example 3 are conducted followed by these additional steps.

Step 4: The tubular solid-state membrane module depicted in FIG. 2 is made by attaching conduits to the open ends of the plurality of tubular membrane units such that each respective conduit is attached to two different membrane units except for the terminal conduits and each membrane unit is attached to two different conduits. The conduits can be made from an oxidation resistant metal alloy that is compatible with the membrane units or a mixed metal oxide. The conduits may be attached to the membrane units by a metal braze seal or a glass ceramic seal as described in Example 3.

Step 5: The tubular solid-state membrane module of step 4 is heated to 850° C., and air at 250 psig pressure is passed over the exterior of the tubular membrane units. A vacuum pump is connected to the open ends of the terminal conduits and >99% pure oxygen is withdrawn from the conduits.

The tubular solid-state membrane modules of the present invention provide an interconnected series of tubular membrane units which maintain pneumatic integrity during operation. Moreover, the tubular solid-state membrane modules overcome problems associated with manifolding and fabrication by eliminating the channeled layer adjacent to the dense mixed conducting oxide layer found in prior art membrane units. Many modifications of the illustrated tubular embodiments may be made without departing from the spirit and scope of the invention as recited by the claims.

We claim:

1. A module for separating oxygen from an oxygen-containing gaseous mixture comprising a plurality of tubular solid-state membrane units, each tubular solid-state membrane unit which comprises a channel-free tubular porous support having connected through porosity which is in contact with a contiguous tubular dense mixed conducting oxide layer having no connected through porosity and at least one channel which is contiguous to the tubular channel-free porous support on a side opposite the tubular dense mixed conducting oxide layer, wherein the tubular dense mixed conducting oxide layer is in flow communication with the oxygen-containing gaseous mixture to be separated and wherein the tubular channel-free porous support of each membrane unit is in flow communication with a removal means for discharging oxygen which has been separated from the oxygen-containing gaseous mixture by permeation through the tubular dense mixed conducting oxide layer of each membrane unit and passage into the removal means via the tubular channel-free porous support of each membrane unit.

2. The module of claim 1 wherein each solid-state membrane unit further comprises a first tubular porous layer having a predetermined average pore radius which is situated between the tubular channel-free porous support and the at least one channel.

3. The module of claim 2 wherein each solid-state membrane unit further comprises a second tubular layer having a predetermined average pore radius which is situated contiguous to the first tubular porous layer on a side opposite the tubular channel-free porous support wherein the average pore radius of the first tubular porous layer is smaller than the average pore radius of the second tubular porous layer.

4. The module of claim 2 or 3 wherein the removal means comprises at least one conduit.

5. The module of claim 2 or 3 wherein the removal means comprises at least one manifold.

6. The module of claim 3 wherein the tubular dense mixed conducting oxide layer has a thickness ranging from 0.01 micrometer to about 500 micrometers.

7. The module of claim 6 wherein the tubular channel-free porous support comprises pores having a diameter of less than 5 times the thickness of the tubular dense mixed conducting oxide layer.

8. The module of claim 6 wherein the tubular dense mixed conducting oxide layer comprises a mixed conducting oxide and the tubular channel-free porous support comprises a mixed conducting oxide.

9. The module of claim 8 wherein the mixed conducting oxide is represented by the formula $A_x A'_{x'} A''_{x''} B_y B'_{y'} B''_{y''} O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $1.1>x+x'+x''>0.9$, $1.1>y+y'+y''>0.9$ and z is a number which renders the compound charge neutral.

10. The module of claim 9 wherein A, A' or A" of the enumerated formula is a Group 2 metal selected from the group consisting of calcium, strontium, barium and magnesium.

11. The module of claim 9 wherein the tubular dense mixed conducting oxide layer is formed from a mixed conducting oxide represented by the formula $La_x A'_{x'} Co_y Fe_{y'} Cu_{y''} O_{3-z}$ wherein $1.1>x+x'>0.9$, $1.1>y+y'+y''>0.9$, $0<y'\leq0.4$ and $0<y''\leq0.4$, A' is selected from strontium, barium or calcium, and z is a number which renders the mixed conducting oxide charge neutral.

12. The module of claim 9 wherein the tubular dense mixed conducting oxide layer is formed from a mixed conducting oxide is selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$, $La_{0.2}Ba_{0.8}Co_{0.6}Cu_{0.2}Fe_{0.2}O_{3-z}$, $La_{0.2}Sr_{0.8}Co_{0.4}Fe_{0.4}Cu_{0.2}O_{3-z}$, $La_{0.4}Sr_{0.6}Co_{0.4}Fe_{0.4}Cu_{0.2}O_{3-z}$, $La_{0.3}Sr_{0.7}Co_{0.8}Fe_{0.1}Cu_{0.1}O_{3-z}$ and $SrCo_{0.4}Fe_{0.4}Cu_{0.2}O_{3-z}$.

13. The module of claim 9 wherein the tubular channel-free porous support is formed from a material selected from the group consisting of alumina, ceria, silica, magnesia, titania, a high temperature oxygen compatible metal alloy, a metal oxide stabilized zirconia and compounds and mixtures thereof.

14. The module according to claim 9 wherein each solid-state membrane unit further comprises a catalyzed layer having through porosity which is contiguous to the tubular dense mixed conducting oxide layer on a side opposite the tubular channel-free porous support.

* * * * *